(12) United States Patent
Henke et al.

(10) Patent No.: US 9,089,142 B2
(45) Date of Patent: Jul. 28, 2015

(54) IMPINGING AIR OVENS HAVING HIGH MASS FLOW ORIFICES

(75) Inventors: Mitchell C. Henke, Fort Wayne, IN (US); Carol S. Nealley, Fort Wayne, IN (US)

(73) Assignee: LINCOLN FOODSERVICE PRODUCTS, L.L.C., Fort Wayne, IN (US)

( * ) Notice: Subject to any disclaimer, the term of this patent is extended or adjusted under 35 U.S.C. 154(b) by 846 days.

(21) Appl. No.: 11/974,274

(22) Filed: Oct. 12, 2007

(65) Prior Publication Data

US 2008/0087175 A1    Apr. 17, 2008

Related U.S. Application Data

(60) Provisional application No. 60/851,484, filed on Oct. 13, 2006.

(51) Int. Cl.
| | |
|---|---|
| A21B 1/26 | (2006.01) |
| F24C 15/32 | (2006.01) |
| A21B 1/24 | (2006.01) |
| A23L 1/01 | (2006.01) |

(52) U.S. Cl.
CPC .............. *A21B 1/245* (2013.01); *A23L 1/0135* (2013.01); *F24C 15/322* (2013.01)

(58) Field of Classification Search
CPC ....... F24C 15/322; F24C 15/32; A21B 1/245; A21B 1/26
USPC .... 99/477, 443 C, 474; 126/21 A, 39 D, 214, 126/21 R; 219/400, 388
See application file for complete search history.

(56) References Cited

U.S. PATENT DOCUMENTS

| | | | |
|---|---|---|---|
| 3,884,213 A | 5/1975 | Smith | 126/21 A |
| 4,066,011 A | 1/1978 | Ballentine | 99/467 |
| 4,154,861 A | 5/1979 | Smith | 426/466 |
| 4,338,911 A | 7/1982 | Smith | 126/214 |
| 4,479,776 A | 10/1984 | Smith | |
| 4,492,839 A | 1/1985 | Smith | |
| 4,626,661 A | 12/1986 | Henke | 219/400 |
| 4,701,340 A | 10/1987 | Bratton et al. | 426/511 |
| 4,750,276 A * | 6/1988 | Smith et al. | 34/612 |

(Continued)

FOREIGN PATENT DOCUMENTS

| | | |
|---|---|---|
| JP | H02503386 A | 10/1990 |
| WO | WO89/08402 | 9/1989 |

(Continued)

OTHER PUBLICATIONS

U.S. Appl. No. 07/662,270, filed Feb. 1991, Applicant: Henke.

(Continued)

*Primary Examiner* — Reginald L Alexander
(74) *Attorney, Agent, or Firm* — Ohlandt, Greeley, Ruggiero & Perle, L.L.P.

(57) ABSTRACT

An air dispensing duct that can be used in an oven to heat or cook food products passing through the oven on a conveyor. The air dispensing ducts comprise a cover plate and at least one columnating plate, and a plurality of orifices disposed on the cover plate and the columnating plate. The orifices are larger than those of the prior art, which advantageously, and counterintuitively, provides for faster cooking of the food product.

16 Claims, 12 Drawing Sheets

(56) References Cited

U.S. PATENT DOCUMENTS

| | | | |
|---|---|---|---|
| 4,781,169 A * | 11/1988 | Henke et al. ............... 126/21 A |
| 4,834,063 A | 5/1989 | Huang et al. ............... 126/214 |
| 4,991,497 A | 2/1991 | Henke et al. |
| 5,025,775 A | 6/1991 | Crisp ............................ 126/21 A |
| 5,131,841 A | 7/1992 | Smith et al. ..................... 432/59 |
| 5,205,274 A * | 4/1993 | Smith et al. ............... 126/21 A |
| 5,423,248 A | 6/1995 | Smith et al. ..................... 99/443 |
| 5,454,295 A * | 10/1995 | Cox et al. ......................... 99/332 |
| 5,539,187 A * | 7/1996 | Smith et al. ..................... 219/681 |
| 6,526,961 B1 | 3/2003 | Hardenburger ............. 126/21 A |
| 6,833,533 B1 | 12/2004 | Wolfe et al. |
| 6,933,473 B2 | 8/2005 | Henke et al. ................. 219/400 |
| 7,258,881 B2 | 8/2007 | Jones et al. ..................... 426/233 |
| 7,846,352 B2 | 12/2010 | Marking et al. |
| 2004/0262286 A1 | 12/2004 | Henke et al. |
| 2005/0139203 A1 | 6/2005 | Jones et al. ................. 126/21 A |
| 2008/0045136 A1* | 2/2008 | Huang ........................... 454/237 |

FOREIGN PATENT DOCUMENTS

| | | |
|---|---|---|
| WO | WO99/61843 | 12/1999 |
| WO | WO2004/110166 | 12/2004 |

OTHER PUBLICATIONS

U.S. Appl. No. 07/846,352, filed Mar. 6, 1992, Applicant: Henke.
Supplemental European Search Report dated Mar. 22, 2010, from the related European Application No. 07839497.0.
International Search Report from corresponding International Application No. PCT/US2007/021840 dated Apr. 4, 2008.
English translation of Japanese Office Action dated Jun. 21, 2012 for corresponding Japanese Patent Application No. 2009-532433.
European Communication pursuant to Article 94(3) EPC dated Jan. 24, 2014 from corresponding EP Application No. 07 839 497.0, pp. 6.
Office Action dated Aug. 6, 2014 for corresponding Korean patent application No. KR520120494507 with English translation, pp. 13.

* cited by examiner

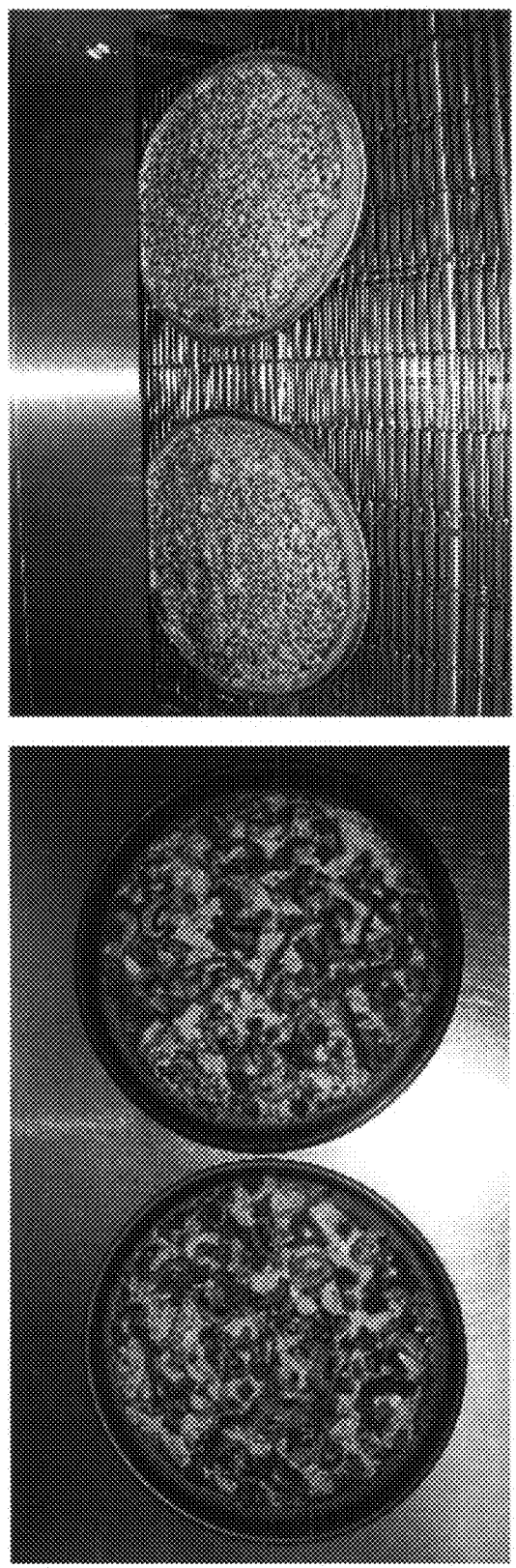

IMPINGING AIR OVENS HAVING HIGH MASS FLOW ORIFICES

CROSS-REFERENCE TO RELATED APPLICATION

The present application claims priority to U.S. Provisional Application No. 60/851,484, filed on Oct. 13, 2006.

BACKGROUND OF THE INVENTION

1. Summary of the Invention

The present disclosure relates to impinging jet air flow ovens. More particularly, the present disclosure relates to impinging jet ovens using larger orifices to carry a high mass flow of air to a food product.

2. Description of the Related Art

Impingement ovens are primarily used in quick service restaurants for rapid cooking of foods such as pizzas, finish heating of plated meals, pre-cooked meals, cookies, protein foods and the like.

Such ovens have jets of heated air which impinge directly upon the surface of the food being cooked. All jets within an oven typically have the same diameter. The ovens typically have an air handling system, to supply and distribute the heated air to the jets and thus the food, and a heating space in which the food is actually cooked.

The food is typically passed into and through the heating space by one or more conveyors per oven. These conveyors can be all in the same vertical plane or can be in multiple planes vertically.

Heated air jets are presented to the food product so that the air jets impinge directly on both the top and bottom of the food product. An energy source and an air moving source supply air to a duct. The duct has a plurality of plates comprising a plurality of orifices. The air jets are formed by air flowing through these orifices. The plates, often referred to as columnating plates, form the jets into a column to be focused/directed onto the food product.

As the demand for reduced cooking and serving times has become greater in cooking applications, it has become necessary to improve the impingement energy application, and to operate in less time than conventional impingement heating equipment, thereby increasing the speed at which the foods can be cooked.

In addition, since the amount of floor space taken up by impingement ovens is of concern in commercial kitchens, it is important to process higher volumes of food product in the same amount of floor space, thus optimizing the effective cooking area within the oven.

Conventional impinging jets can operate with orifice sizes of $3/8$" to $7/16$", approximately 3" to 4" away from the food product to be cooked. One method previously considered to increase the output and efficiency of the oven was to operate the heating process at as great a temperature difference between the product temperature and the oven temperature as possible, which accelerates the transfer of heat. However, with this method, smaller orifices in a 3" to 4" proximity to a food product cause overheating of the food product surface very quickly. This is due to the velocity of the heat being transferred via the small diameter of the contact area per orifice. Air coming through the smaller orifices travels at high velocity onto the surface of the food product, resulting in rapid removal of surface moisture and the overcooking of the product, thus producing undesirable surface coloration and charring of the food product.

Accordingly, there is a need for a new design for an impinging air jet that addresses the problems of currently available systems.

SUMMARY OF THE INVENTION

The present disclosure provides an impinging air oven that has air ducts comprising columnating plates and cover plates that have larger orifices than those in currently available impinging oven systems. The present disclosure has discovered, unexpectedly, that the larger orifices provide significantly improved cooking results and oven efficiency over currently available systems, while maintaining or improving the quality of the cooked food product. The orifices of the air ducts can be in a variety of shapes and configurations on the cover and columnating plates. The heat transfer rates of the air ducts to the food product can be changed by manipulating the orientation and size of the orifices.

Thus, in one embodiment, the present disclosure provides an air dispensing duct. The air dispensing duct comprises a cover plate, and at least one columnating plate. The cover plate and the columnating plates each have a plurality of orifices disposed thereon, wherein the orifices are substantially round in shape, and have a diameter ranging from about 0.5 to about 2.0 inches.

In a second embodiment, the present disclosure provides an oven for cooking or heating a food product. The oven comprises a plurality of air dispensing ducts and a conveyor. The food product is disposed on the conveyor while within the oven. The air dispensing duct comprises a cover plate, and at least one columnating plate. The cover plate and the columnating plates each have a plurality of orifices disposed thereon, and the orifices have an area equivalent to that of a circle having a diameter between about 0.5 to about 2.0 inches.

DESCRIPTION OF THE DRAWINGS

FIGS. 10 through 13 are pictures of food products cooked with ovens using the smaller orifices of currently available ovens;

DETAILED DESCRIPTION OF THE INVENTION

Figure 1:
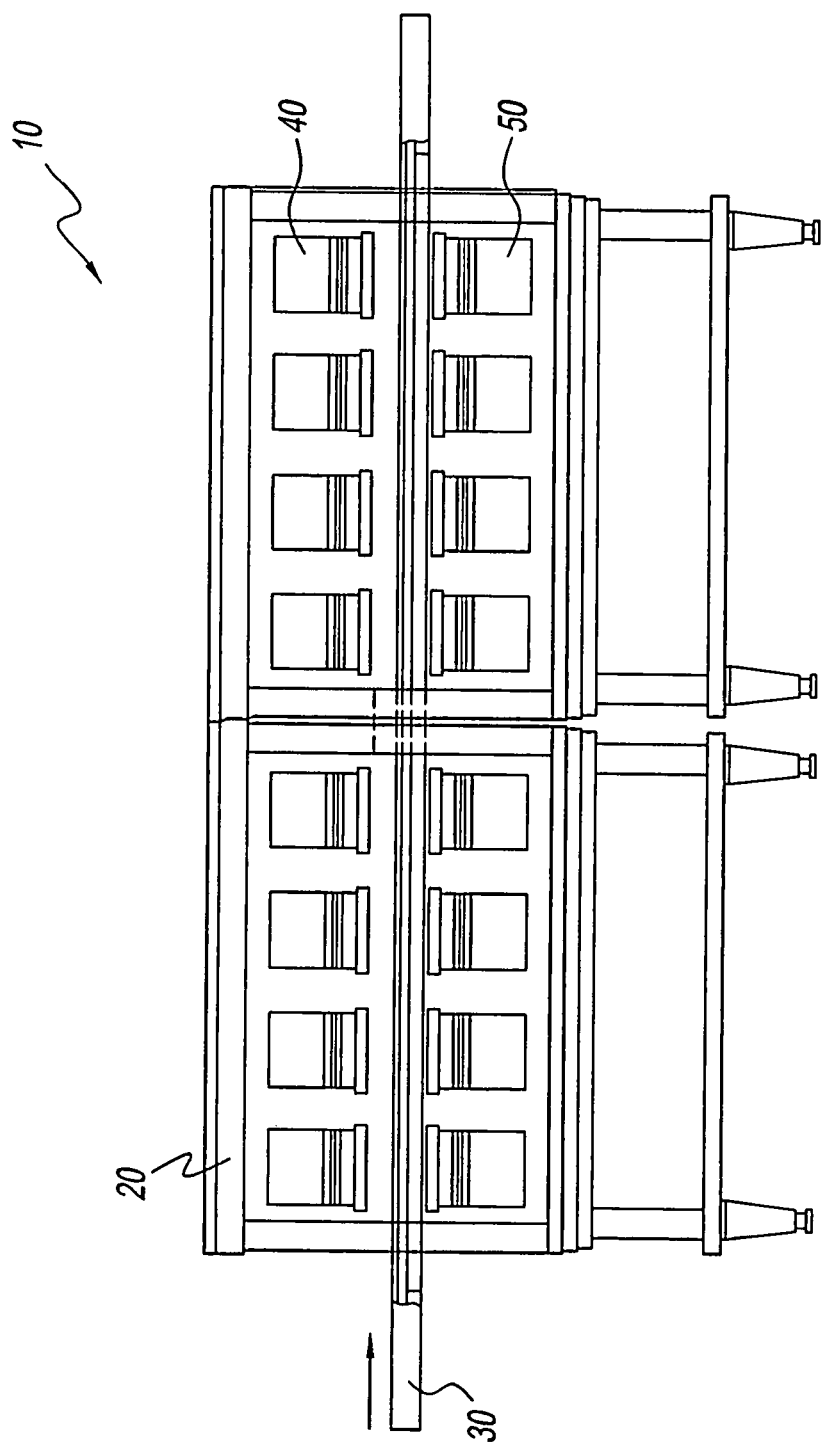
FIG. 1 is a diagram of an oven used for cooking food products according to the present disclosure.
Figure 2:
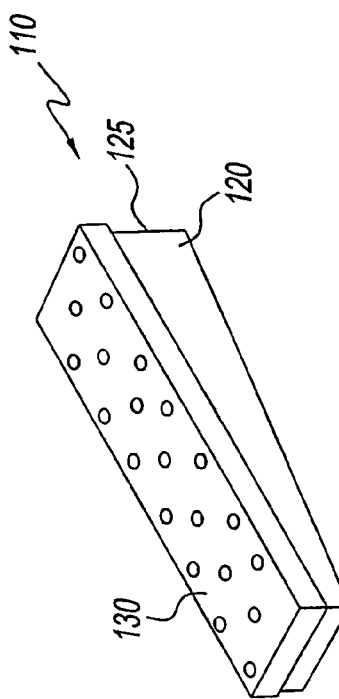
FIG. 2 is a perspective view of an impingement duct of the present disclosure.
Figure 4:
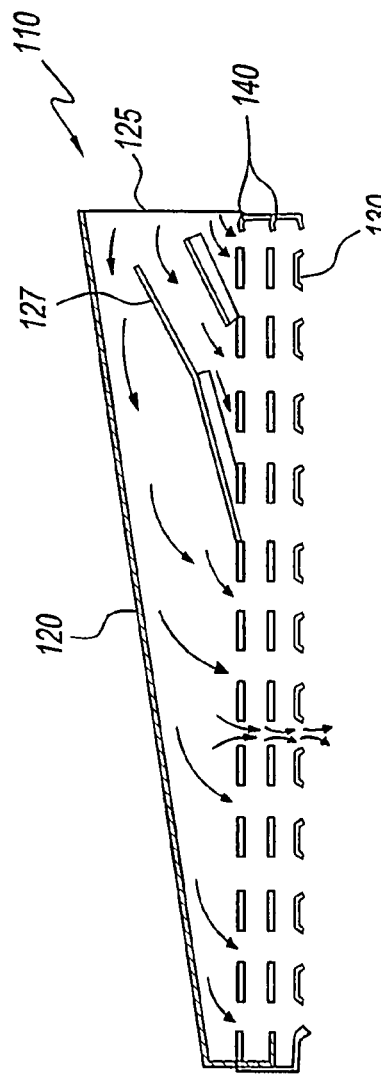
FIG. 4 is a side cross-sectional view of the impingement duct of FIG. 2.
Figure 3:
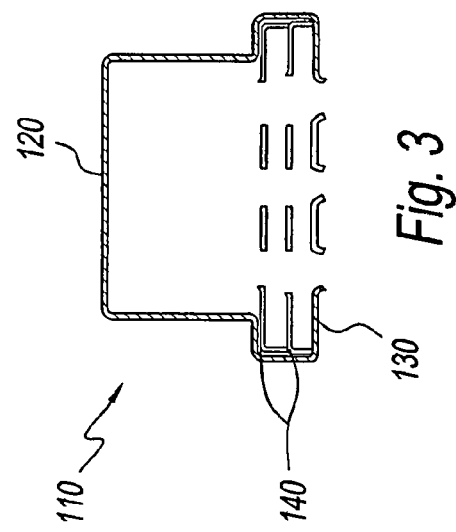
FIG. 3 is a front cross-sectional view of the impingement duct of FIG. 2.

The present disclosure provides an impinging jet air duct with larger orifices and jet columns of heated air than have been considered in prior art for cooking ovens. The air ducts of the present disclosure comprise a housing, a cover plate, and at least one columnating plate. There are a plurality of orifices disposed about the cover and columnating plates. The orifices of the present disclosure can be round and have diameters ranging from about 0.5 to about 2.0 inches. The orifices can also have diameters between about 0.625 inches to about 0.875 inches. The orifices may also be in any shape, and have an area equivalent to the above-described circular orifices. The orifices can be spaced at 0.5 inch to 6 inch intervals, and can be arranged in either radial or linear patterns. The spacing from the orifices to the food product to be heated can be from about 2 to about 8 inches.

An unexpected effect of using the larger orifices of the present disclosure at the same temperature difference is that the surface of the food product can accept a significantly greater amount of heat energy onto and through the surface by convection and/or conduction. The high mass flow larger orifices of the present disclosure drive heat to the center of the cooking product and cause cool moisture to migrate outward to the surface of a product 15 to 40% faster than with conventional smaller orifices. Because the larger, high mass flow jets do not remove the moisture at the surface faster than it comes to the surface, the result is to heat the food product through to the center significantly faster, while not drying out the surface of the food product. Large orifices provide direct, bulk heat transfer in an array of reduced velocity columns of air with high mass flow, yet still maintain focused contact areas with the food product.

Conventional impinging ovens with smaller air jets were also limited from being able to cook dense products as well as thinner, less dense products within the same time settings. The present disclosure, by contrast, is capable of baking a wider range of product thicknesses and densities than the impinging ovens with the conventional smaller air jets.

Additionally, the use of the high mass flow orifices of the present disclosure reduces the energy required from the oven to properly heat the food products, as less time is required to heat the product properly than with conventional smaller air jets. Additionally, the utensils that hold the food product are heated uniformly and faster, which leads to a better food product.

A further unexpected result of the present disclosure is that greater heat transfer occurs at a lower noise level due to the physical properties of the invention. In the past, in order to provide a greater heat transfer rate, a higher volume of air had to be driven through the conventional size orifices, which resulted in extremely high noise levels. The impinging jet of the present disclosure increases mass flow for the cooking and heating method described with no increase in noise level for the operating system. In fact, experimental data shows noise reductions while yet increasing mass flow and resulting in increased productivity and quality.

The orifices of the present disclosure can be arranged on the cover in any pattern and can comprise one or more orifice shapes. In one embodiment, the orifices are arranged in a line that is parallel to the longitudinal axis of the air duct. The orifices can also have varying diameters within a single air duct. For example, within a single air duct, the orifices can have the larger sizes of the present disclosure, or can have more conventional, smaller sizes.

There can also be multiple columnating plates per air duct, which are arranged in parallel vertical planes within the air duct, and can be used to manipulate and change the shape or the columnation of the air jet. There can be from 1 to 4 columnating plates in the air ducts of the present disclosure. The spacing of the columnating plates can vary from 0.5 to 2 inches, and can be spaced at a dimension that is equal to the diameter of the circular orifice. For example, for orifices that are 0.5 inches in diameter, the columnating plates should be spaced 0.5 inches apart, for 1 inch diameter orifices 1 inch spacing, etc.

The spacing between the cover plates of the present disclosure and the columnating plates can range from between about two to about five times the diameter of the orifices used. In one embodiment, the spacing between the cover plate and the columnating plate is between about 1.0 inch and about 1.75 inches.

The orifices and columnating plates of the present disclosure can be used in impinging air ducts, which are disposed within an oven. There can be several orientations of air ducts within an oven. For example, in FIG. 1, one embodiment of an oven is shown. Oven 10 has cabinet 20, conveyor 30, a plurality of upper air ducts 40, and a plurality of lower air ducts 50. In the shown embodiment, there are eight upper air ducts 40 and eight lower air ducts 50. The present disclosure, however, contemplates the use of different configurations of upper and lower air ducts. Thus, during operation of oven 10, a food product is conveyed by conveyor 30 between upper air ducts 40 and lower air ducts 50, where it is heated by air exiting the ducts.

Figure 5:
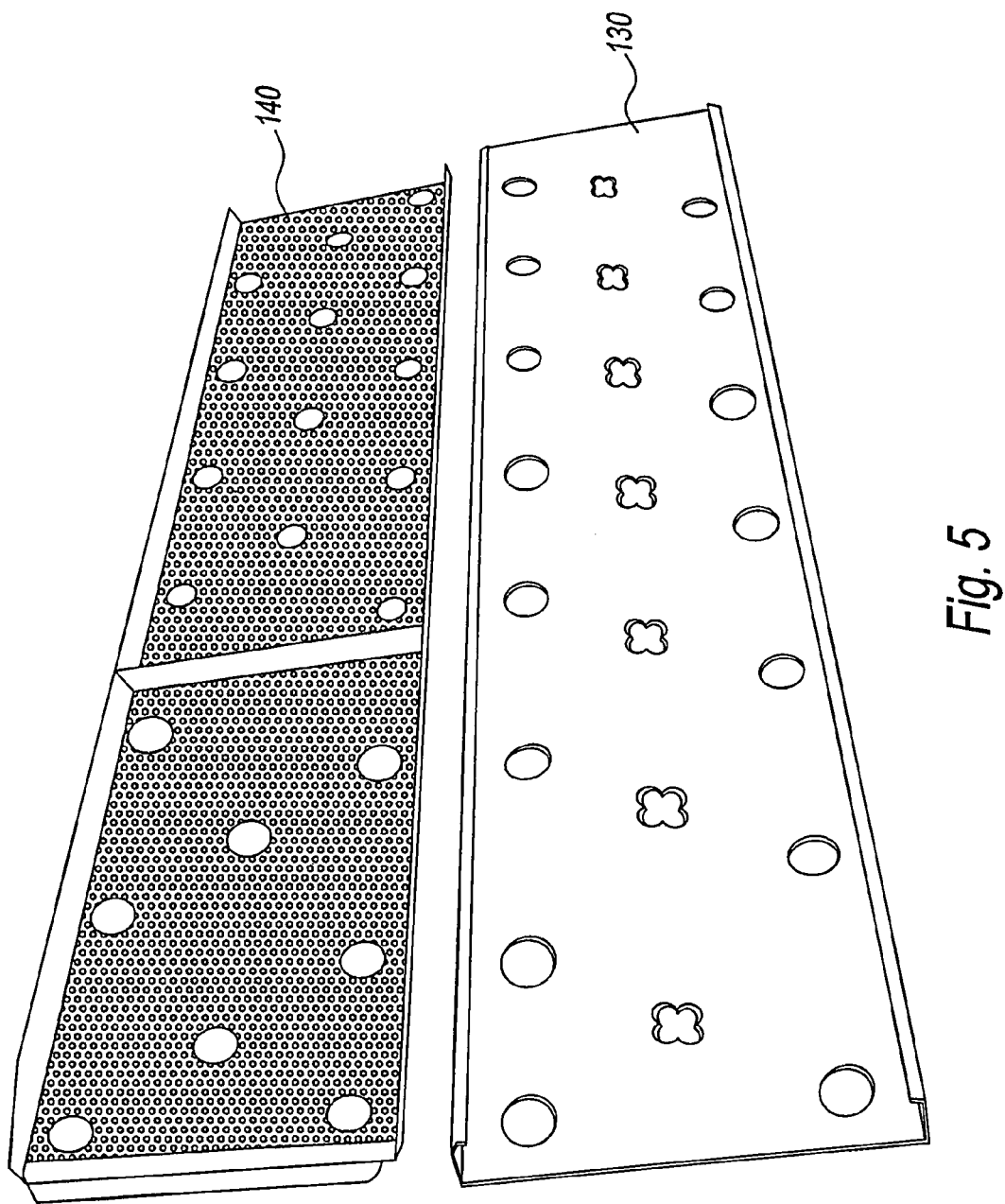
FIG. 5 is a top view of a columnating plate and a cover plate of the present disclosure.

Referring to FIGS. 2-5, an impingement duct having the high mass flow orifices of the present disclosure is shown. Impingement duct 110 has housing 120, cover plate 130, and two columnating plates 140. Cover plate 130 and columnating plates 140 have a plurality of orifices disposed thereon. Housing 120 has opening 125 and optionally a plurality of air dams and air guides 127 disposed therein to assist with the even distribution of air throughout the duct 110. Thus, during operation of an oven, such as oven 10, air enters duct 110 through opening 125, and is dispersed throughout housing 120. It then passes through columnating plates 140 and cover plate 130 before exiting duct 110 in columnated air jets. In the shown embodiment, there are two columnating plates 140. However, as previously discussed, the present disclosure contemplates the use of 1 to 4 columnating plates. Referring specifically to FIG. 5, an embodiment of the orifices is shown. In this embodiment, there are three rows of orifices in both the cover plate 130 and the columnating plate 140. The orifices in columnating plate 140 are arranged in three rows of circular shapes. The orifices in cover plate 130 are also arranged in three rows. The outer rows have orifices that are circular in shape, and the middle row has orifices shaped like crosses. As previously discussed, however, the present disclosure contemplates a number of orientations and shapes for the orifices in the cover plate 130 and columnating plate 140. Such shapes can include, but are not limited to, rectangles, squares, diamonds, polygonal shapes, or any other shape suitable for such a purpose. As previously discussed, these shapes can have an area equivalent to a circular orifice having the disclosed diameters. In addition, the orifices in both the columnating and cover plates can be of varying sizes. Furthermore, in the shown embodiment, there are 22 orifices in cover plate 130 and columnating plate 140. The present disclosure, however, contemplates the use of fewer or greater numbers of orifices.

Figure 6:
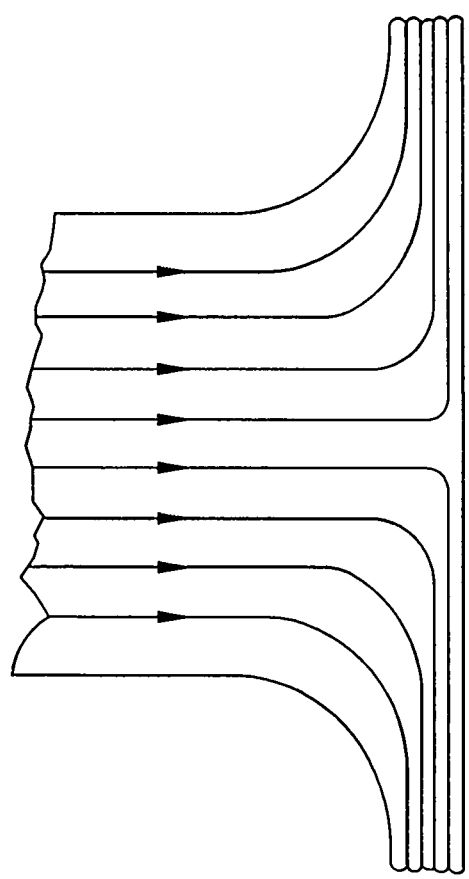
FIG. 6 is a schematic of an air flow profile of the large orifices of the present disclosure.
Figure 7:
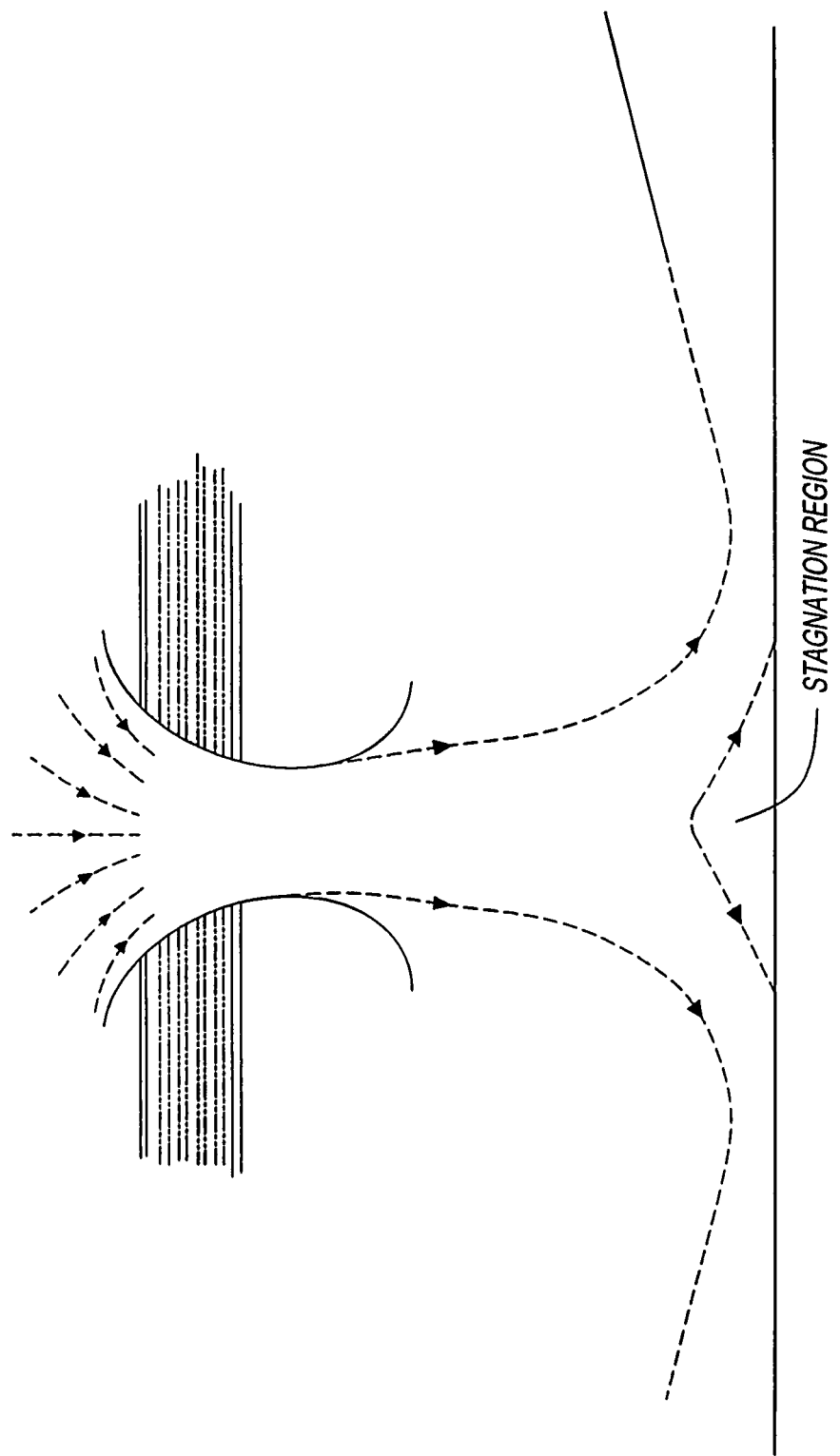
FIG. 7 is a schematic of an air flow profile of the small orifices of currently available ovens.

Referring to FIGS. 6 and 7, profiles of air exiting orifices of the present disclosure and the prior art are shown. Referring specifically to FIG. 6, a columnated air jet of the present disclosure is shown hitting a flat surface. As can be seen in this diagram by the lines representing the air flow, the larger orifices provide air jets that, while moving at a slower velocity overall, provide better contact with the surface to be heated. In FIG. 7, by contrast, which is an air flow diagram of an air jet of the prior art, the air flow is such that there is a stagnation region on the surface of the product to be heated, where no air flows directly onto the product. The product is thus heated less efficiently, producing an undesirable result.

Figure 8:
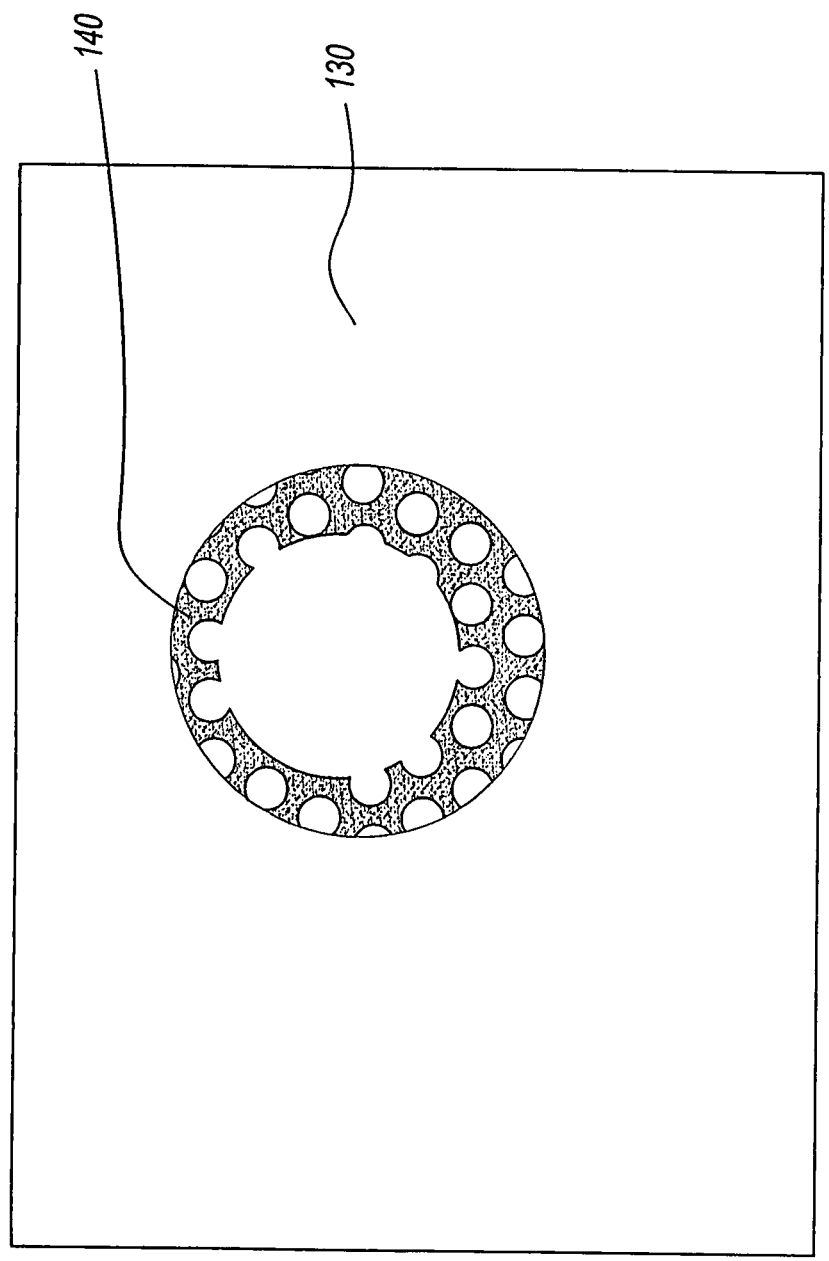
FIG. 8 is a bottom view of an orifice in the columnating plate and the cover plate of the present disclosure.

As shown in FIG. 8, the orifices in the columnating plate 140 can be smaller than the corresponding orifices in the cover plate 130. This relationship helps to create a wider jet, and a larger area of contact with the food product. The ratio of the diameter of the columnating plate orifice to the diameter of the cover plate orifice can be from 4:5 to 4:16, and is preferably 5:7. The present disclosure also contemplates columnating plate orifices that are larger or the same size as the orifices in the cover plate. If the columnating plate orifices are larger than the cover plate orifices, they have diameters in a ratio of from 5:4 to 16:4 with the diameter of the cover plate orifices, and preferably in a ratio of 7:5.

Figure 9:
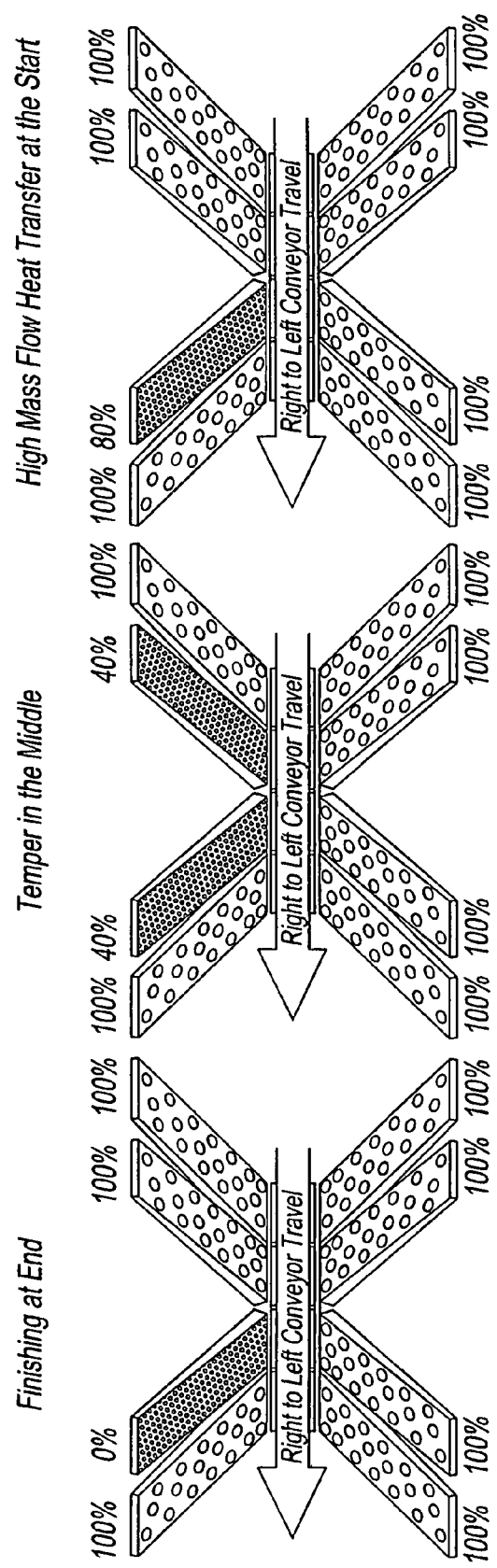
FIG. 9 is a schematic view of an oven of the present disclosure.
Figure 11:
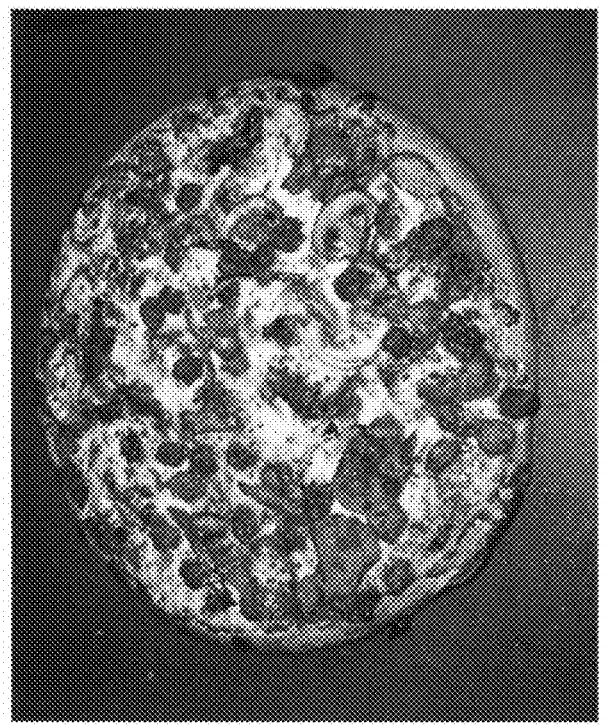
Figure 10:
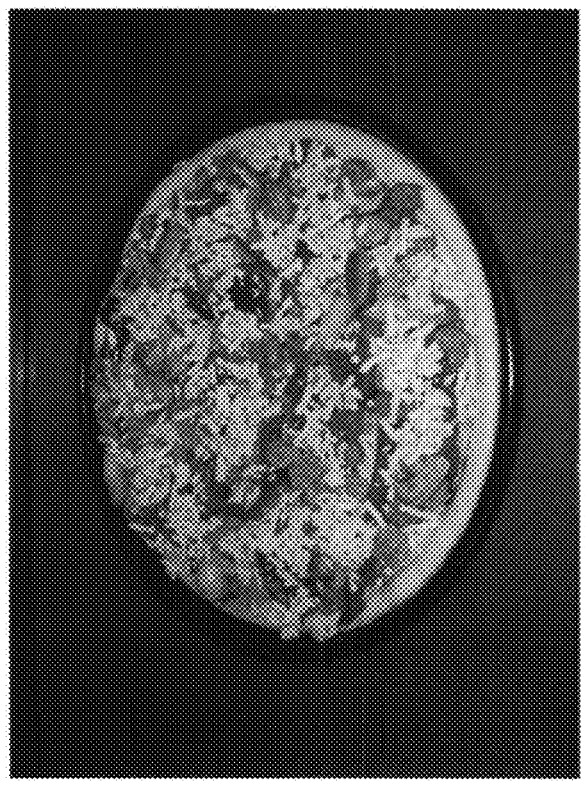
Figure 15:
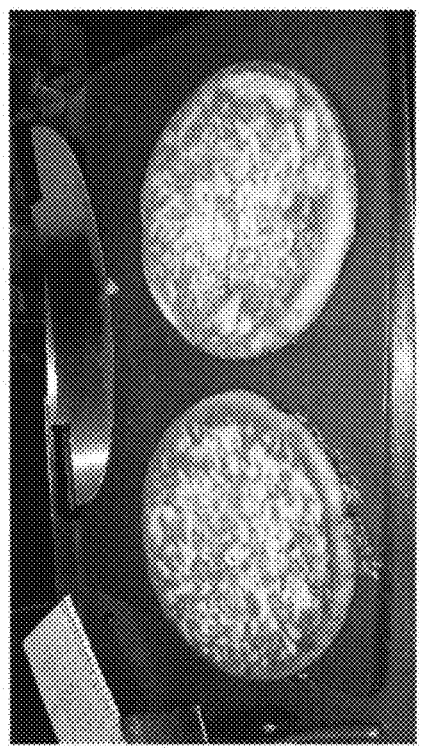
FIGS. 14 through 17 are pictures of food products cooked with ovens using the large orifices of the present disclosure.
Figure 14:
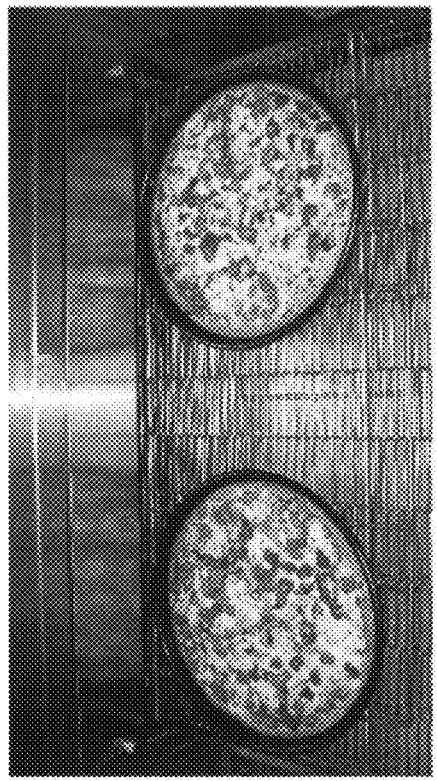
Figure 17:
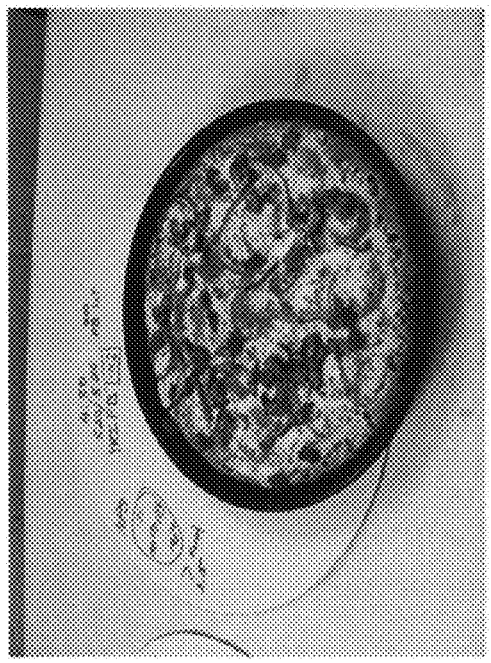
Figure 16:
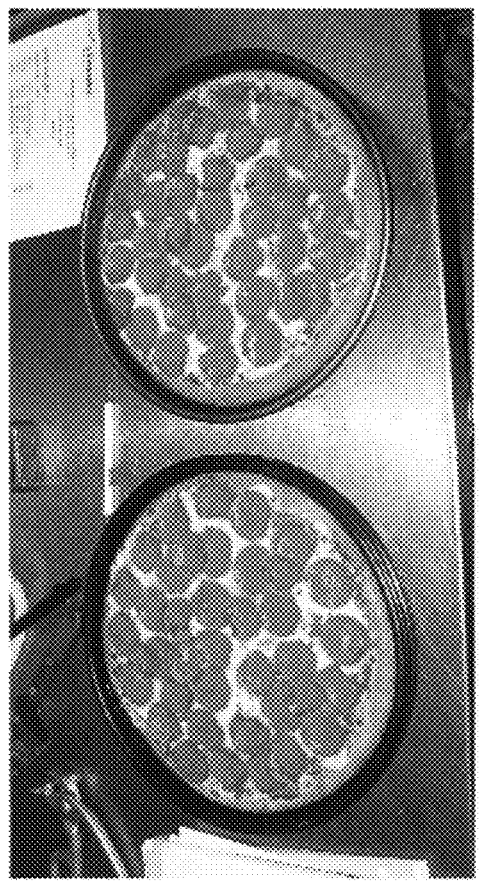

The present disclosure also contemplates using the larger orifices previously discussed, in ovens that have impinging jets with heat transfer rates that vary throughout the oven. In this embodiment, the heat transferred to the food product can be applied in steps, to match the product's ability to accept energy per unit of time. In other words, the heat transfer rates of the air ducts in an oven (such as oven 10, discussed above) can be varied to provide higher or lower rates of heat transfer at different points along the conveyor within the oven. Such a configuration is shown in FIG. 9. In this embodiment, the air jets can be partially or completely shut off to alter the heat transfer rate to the food product. In the embodiment shown in FIG. 9, consisting of multiple, connected, cooking cavities (there are three in the shown embodiment) which has twelve air jets disposed above and below the conveyor, the third air jet on the top of the oven system is operating at an 80% capacity. The fourth and fifth jets on the top are operating at 40% capacity, and the eleventh air jet on the top is completely closed off. The air jets on the bottom of the conveyor all remain at full capacity, (but may be partially or fully closed if needed). The air jets of this embodiment can have any number of varying capacities other than the specific arrangement shown. The cover plates of the air ducts can be covered with mechanical structures to achieve the desired capacity.

Thus, the unexpected result of the present disclosure is that using larger orifices helps to cook the food products more efficiently. This is an inversion of the commonly understood relationship between orifice size and cooking capacity. As a result, higher temperatures can be used with the orifices, without burning the surface of the food product. In addition, although the mass flow coming out of the air jets is high, the velocity is low enough so that the surface of the food product is not disturbed. The orifices of the present disclosure can increase the heating efficiency of the oven by up to 40% over currently available ovens, which can provide up to a 40% reduction in the amount of floor space taken up by the oven to maintain equal capacity.

Examples of food products cooked using the ovens having the standard size orifices and the larger orifices of the present invention are shown in FIGS. 10-17. For example, the food products shown in FIGS. 10-13 were cooked at 480° F. for 7 minutes, and the ovens used had impinging jets having 90 orifices at a diameter of 7/16". These food products, while acceptable, have crust and toppings that are at the maximum acceptable color. The food products shown in FIGS. 14-17, by contrast, bake for 5.5 minutes at 500° F., or at 4.5 minutes at 520° F. The impinging jets of this oven had 22 orifices at a diameter of 7/8". The crust and toppings of these food products are at a color that is in the middle of acceptable ranges. Thus, the products cooked using the orifices of the present disclosure are preferable.

Figure 18:
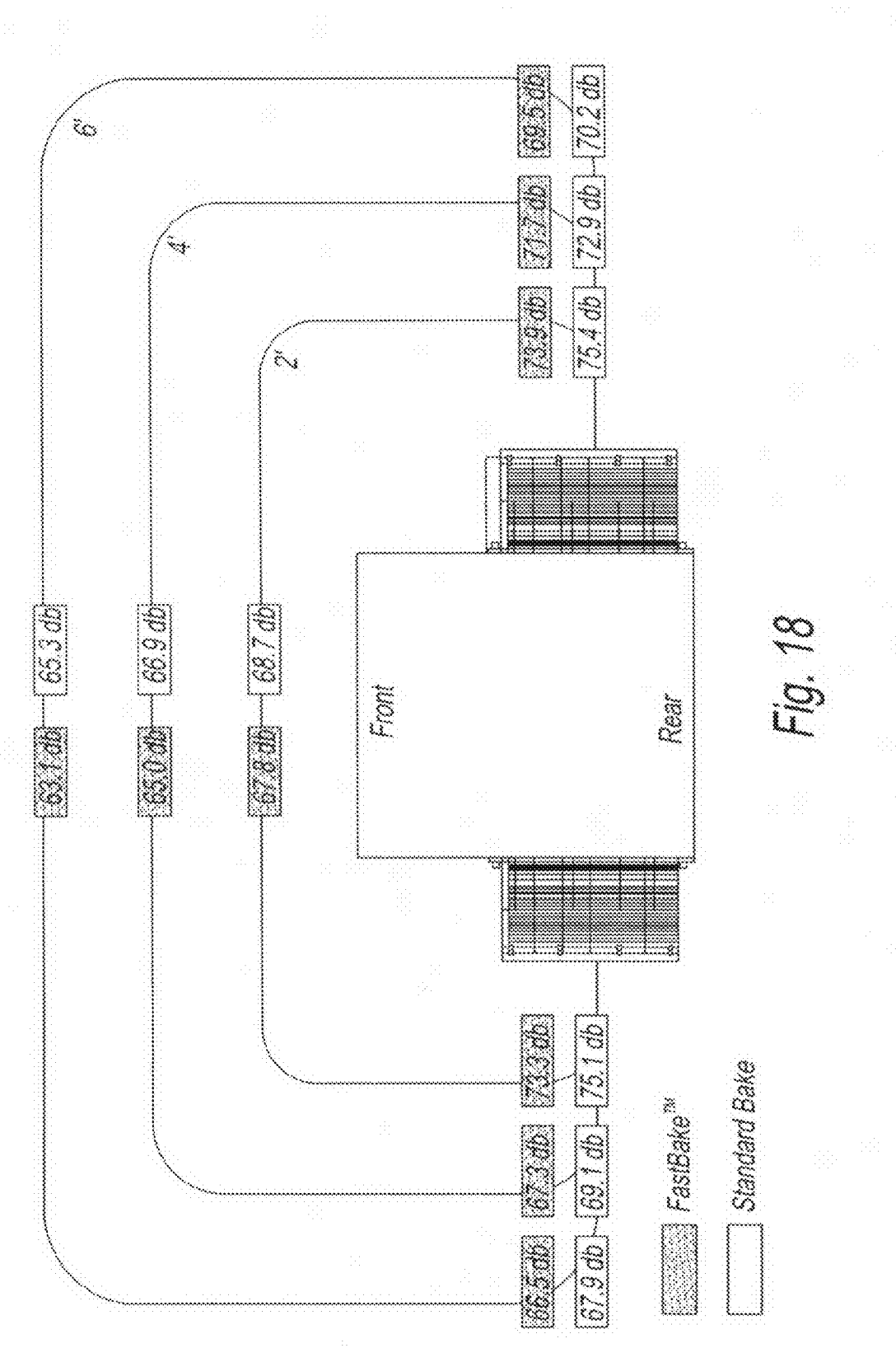
FIG. 18 is a graph showing decibel readings around the oven of the present disclosure, using both the small orifices of currently available ovens and the large orifices of the present disclosure.

Another benefit provided by the orifices of the present disclosure is illustrated in FIG. 18. As shown, ovens using the orifices of the present disclosure (referred to as "FastBake" in the diagram) exhibit significantly lower noise readings at various points around the oven than ovens using the standard orifices. This can be highly advantageous in the applications where the oven is used.

The orifices and air ducts of the present disclosure can be used with any number of air sources to supply air to the air jets. These air sources may include, but are not limited to, axial flow fans, centrifugal flow fans, variable speed fans, multiple fans having fixed or variable speeds, any flow means capable of supplying air to the impingement duct, or any other suitable methods of providing air for such a use. The energy sources used to provide heat can be, but are not limited to, modulating energy sources and heating controls, power burners, tube burners, powered tube burners, electrical heat sources, powered ceramic burners, or burners with a heat exchanger or other suitable combustion or electrical source. In addition, alternate and supplemental sources of energy can be used in the oven, such as, but not limited to, infrared energy with a tubular heater, infrared energy with a reflected plate radiator, saturated steam energy to enhance the orifice energy, supersaturated steam energy to enhance the orifice energy, moisture combined with the orifice energy, moisture injected into the orifice energy space, low frequency microwave energy to enhance the orifice energy, and high frequency microwave energy to enhance the orifice energy. The oven of the present disclosure can also have a closable inlet and outlet, or an active air curtain located at the entrance and exit of the oven, to reduce energy losses.

The orifices of the present disclosure may be perpendicular to the food products, or may be disposed at an angle to the food product, depending on the desired cooking effect. A preferred range of angles may be zero degrees to forty-five degrees from the perpendicular direction. The oven may also have one or more conveyors, which are configured to move food products at a higher or lower position with respect to the air jets during travel. The oven conveyor surface may also have a pitch spacing to facilitate optimal heat transfer to the food product or utensil in which the food product is cooked.

The present invention having been thus described with particular reference to the preferred forms thereof, it will be obvious that various changes and modifications may be made therein without departing from the spirit and scope of the present invention as defined herein.

What is claimed is:

1. An air dispensing duct, comprising: a cover plate;
a columnating plate, wherein said cover plate and said columnating plate each have a plurality of orifices therein; and
a housing connected to said cover plate and said columnating plate, said housing having an interior space and opening at one end for receiving air, so that air enters the air dispensing duct through said opening, is dispersed throughout said interior space, and passes out through said columnating plate and said cover plate,
wherein said cover plate and said columnating plate are spaced apart at a distance of 1.0 to 1.75 inches,
wherein said orifices are substantially round in shape, and have a diameter ranging from 0.5 to 2.0 inches,
wherein a ratio of said diameter of said orifices in said columnating plate to said diameter of said orifices in said cover plate is between 4:5 to 1:4, and wherein said diameter of said cover plate orifices and said columnating plate orifices is fixed.

2. The air dispensing duct of claim 1, wherein the orifices have a diameter ranging from 0.625 to 0.875 inches.

3. The air dispensing duct of claim 1, wherein said orifices are spaced at a distance between 0.5 to 6 inches.

4. The air dispensing duct of claim 1, wherein there is a plurality of said columnating plates spaced 0.5 inches to 2 inches apart.

5. The air dispensing duct of claim 1, wherein said columnating plate has a substantially flat, planar portion where said columnating plate orifices are located.

6. The oven of claim 1, wherein said columnating plate has a substantially flat, planar portion where said columnating plate orifices are located.

7. An air dispensing duct, comprising:
   a cover plate;
   one, single columnating plate, wherein said cover plate and said columnating plate each have a plurality of orifices therein; and
   a housing connected to said cover plate and said columnating plate, said housing having an interior space and opening at one end for receiving air, so that air enters the air dispensing duct through said opening, is dispersed throughout said interior space, and passes out through said columnating plate and said cover plate,
   wherein said cover plate and said columnating plate are spaced apart in a vertical direction, at a distance of 1.0 to 1.75 inches,
   wherein said orifices are substantially round in shape, and have a diameter ranging from 0.5 to 2.0 inches,
   wherein a ratio of said diameter of said orifices in said columnating plate to said diameter of said orifices in said cover plate is between 4:5 to 1:4, and
   wherein said diameter of said cover plate orifices and said columnating plate orifices is fixed.

8. An oven for cooking or heating a food product, comprising:
   a plurality of air dispensing ducts; and
   a conveyor,
   wherein the food product is disposed on said conveyor while within said oven, and wherein said air dispensing duct comprises:
   a cover plate;
   a columnating plate, wherein said cover plate and said columnating plate each have a plurality of orifices therein; and
   a housing connected to said cover plate and said columnating plate, said housing having an interior space and opening at one end for receiving air, so that air enters the air dispensing duct through said opening, is dispersed throughout said interior space, and passes out through said columnating plate and said cover plate,
   wherein said cover plate and said columnating plate are spaced apart at a distance of 1.0 to 1.75 inches,
   wherein said orifices have an area equivalent to that of a circle having a diameter between 0.5 to 2.0 inches,
   wherein a ratio of said area of said orifices in said columnating plate to said diameter of said orifices in said cover plate is between 4:5 to 1:4, and
   wherein said diameter of said cover plate orifices and said columnating plate orifices is fixed.

9. The oven of claim 8, wherein said orifices have at least one shape selected from the group consisting of rectangles, squares, diamonds, and polygonal shapes.

10. The oven of claim 8, wherein said orifices are substantially circular, and have a diameter between 0.5 to 2.0 inches.

11. The oven of claim 10, wherein said orifices are substantially circular, and have a diameter between 0.625 to 0.875 inches.

12. The oven of claim 8, wherein at least one air dispensing duct is disposed on a first side of said conveyor, and at least one air dispensing duct is disposed on an opposite side of said conveyor.

13. The oven of claim 12, wherein said air dispensing ducts are disposed 2 to 8 inches away from said conveyor.

14. The oven of claim 8, further comprising at least one additional conveyor.

15. The oven of claim 8, wherein air flow entering at least one of said plurality of air dispensing ducts is at least partially obstructed, so that said plurality of air dispensing ducts have varying rates of heat transfer to the food product.

16. The oven of claim 8, where a vertical distance between said conveyor and said cover plate is between 2 to 8 inches.

* * * * *